United States Patent [19]

Yonezawa

[11] Patent Number: 5,071,109

[45] Date of Patent: Dec. 10, 1991

[54] HYDRAULIC CLAMP WITH INCLINED DIRECT OPERATED CLAMPING-MEMBER

[75] Inventor: Keitaro Yonezawa, Kobe, Japan

[73] Assignee: Kabushiki Kaisha Kosmek, Kobe, Japan

[21] Appl. No.: 619,988

[22] Filed: Nov. 30, 1990

[30] Foreign Application Priority Data

Dec. 7, 1989 [JP] Japan .................................. 1-320108

[51] Int. Cl.[5] .................................................. B23Q 3/08

[52] U.S. Cl. ...................................................... 269/137

[58] Field of Search .................... 269/32, 25, 137, 134, 269/157

[56] References Cited

U.S. PATENT DOCUMENTS 2,987,972 6/1961 Schneider ............................ 269/137
3,595,112 7/1971 De George et al. ................ 269/137
4,830,349 5/1989 Miyata .................................. 269/32

FOREIGN PATENT DOCUMENTS 56-163854 12/1981 Japan .

*Primary Examiner*—Robert C. Watson
*Attorney, Agent, or Firm*—Bacon & Thomas

[57] ABSTRACT

A hydraulic clamp includes an inclined direct operated clamping member, a cylinder bore formed in a housing in such an inclined manner as forwardly descending, a piston inserted into the cylinder bore, a clamping actuation hydraulic chamber formed behind the piston within the cylinder bore, and a clamping member forwardly protruding from the upper portion of the front end of the piston. A spring accommodation recess is formed so as to extend rearward from the piston front end, and a spring retainer is supported by the housing in front of the piston. An unclamping spring is installed between the spring retainer and a spring retaining seat formed in the rearward most portion of the spring accommodation recess.

6 Claims, 5 Drawing Sheets

HYDRAULIC CLAMP WITH INCLINED DIRECT OPERATED CLAMPING-MEMBER

BACKGROUND OF THE INVENTION

1. Field of the Invention

The present invention relates to a hydraulic clamp adapted to clamp a member to be clamped or fixed such as a metal mold, a work plate and the like onto a fixed annular table of an injection molding machine, a machine center and so on, and more specifically to a hydraulic clamp of the type including a hydraulically operated piston actuated along an axis declining in a forward direction to directly engage and clamp a member to be clamped.

2. Description of Prior Art

Such a hydraulic clamp is generally described in Japanese Patent laid open Publication No. 1981-163854.

As shown in FIGS. 9 and 10, the basic construction described in the known system is as follows.

Specifically, a cylinder bore 108 is formed in a housing 105 of a hydraulic clamp 104 so that the bore declines in a forward direction and a piston 109 is inserted in fluid tight relation into said cylinder bore 108 so as to be movable forward and backward therein.

A clamping member 112 is disposed on the forward side of the piston 109, and said clamping member 112 is interlockingly connected to the piston 109 so as to be movable together therewith.

A clamping actuation hydraulic chamber 114 is formed in the cylinder bore 108 behind said piston 109.

When the piston 109 is retracted, the clamping member 112 is in the unclamped state, whereat the clamping member 112 is retracted to an unclamped position rearwardly towards the back and upper side of the cylinder bore. When the piston 109 is actuated forwardly by the hydraulic pressure admitted to the clamping actuation hydraulic chamber 114 the clamping member 112 is advanced to a clamping position X toward a forward and lower side so as to assume a clamping state at which a fixed portion 102*a* of a metal mold 102 (clamped member D) in the front of the housing 105 is fixedly clamped by the clamping member 112 from above.

In the above basic known construction, conventionally a guide hole 110 of a smaller diameter than that of the cylinder bore 108 was coaxially formed through the front lower portion of the cylinder bore 108. A piston rod 111 was inserted into the guide hole 110, and the back portion thereof was fixed to the piston 109 and the clamping member 112 was provided in the front portion of piston rod 111.

The following problems are associated with the above mentioned prior art construction.

a) Working accuracy of a process machine is low.

Since a piston rod 111 inherently is smaller in outer diameter and in cross-sectional area, its bending ridigity is small. Accordingly, when a pulling-up impact such as a metal mold removing force and a work processing reaction force is imposed on the clamped member D when the member is fixedly clamped to the fixed angular table 101 of the process machine, the piston rod 111 and the clamping member 112 are elastically deformed by the reaction force, so that the fixed member D raises from the table 101 and working accuracy is correspondingly lowered by that pulled up portion.

b) The service life of the hydraulic clamp is short.

Since the piston rod 111 has a small diameter and a small cross-sectional area, and is subject to a large bending stress acting on it at the time of clamping, it is apt to become fatigued by an accumulated number of clamping operations and its fatigue life is shortened. Accordingly, the service life of the hydraulic clamp is short.

c) The clamped area of the clamped member is apt to be damaged.

Since the clamping member 112 is attached to the piston rod 111, which rod has a small diameter, the clamping surface of the clamping member 112 inherently is small. Therefore, the clamped area of member D is subjected to an intense localized surface pressure when being clamped and the clamped area 102(*a*) thereof is apt to become damaged.

SUMMARY OF THE INVENTION

The present invention has for its objectives the enhancement of process accuracy of a process machine, elongation of service life of a hydraulic clamp, and prevention of damage to a clamped member.

For accomplishing the aforementioned objectives, the present invention adds the following improvements to the above-mentioned basic construction. Specifically, at least the upper portion of the surrounding surface of the cylinder bore is so formed as to extend and open to the front end surface of the housing. The clamping member is formed by an integral protrusion of the upper portion of the piston at its forward end. A spring accommodation recess is formed in the piston so as to extend rearwardly from its front end and an unclamping (clamp release) spring is accommodated within the spring accommodation recess. A spring retainer is supported by the housing forwardly of the piston, with the front end portion of the unclamping spring received by said spring retainer. The back, end portion of the spring abuts a spring retainer seat located at the rearward most portion of the spring accommodation recess.

According to the above-mentioned construction, the following advantages are obtained.

a) Accuracy of the processing machine can be enhanced

Since the directly protruding clamping member integrated with the piston can be manufactured with a large diameter and have a large cross-sectional area, its bending rigidity becomes larger. Therefore, even when a pulling up impact force is imposed on the clamped member, the upward elastic deformation of the clamping member will be small, the clamped member can be prevented from being lifted up and the processing accuracy can be enhanced.

b) The service life of the hydraulic clamp becomes longer

The clamping member, having a large cross-sectional area, is only subjected to a small bending stress at the time of clamping, and its fatigue life becomes longer. Therefore, the service life of the hydraulic clamp becomes longer.

c) Damage to the clamped member can be prevented.

Since the clamping surface of the clamping member can be made to extend over a large area, the surface pressure exerted at the clamping area of the clamped member can be smaller and the damage to clamped area is prevented.

The above and other important advantages of the prevent invention will be better understood from the following detailed description of preferred embodiments of the invention made with reference to the accompanying drawings, in which:

DESCRIPTION OF THE PREFERRED EMBODIMENTS

FIGS. 1-6 show a first preferred embodiment of the invention, namely, a device for fixing a metal mold of a turn table injection molding machine by means of a hydraulic clamp according to the present invention.

Figure 3:
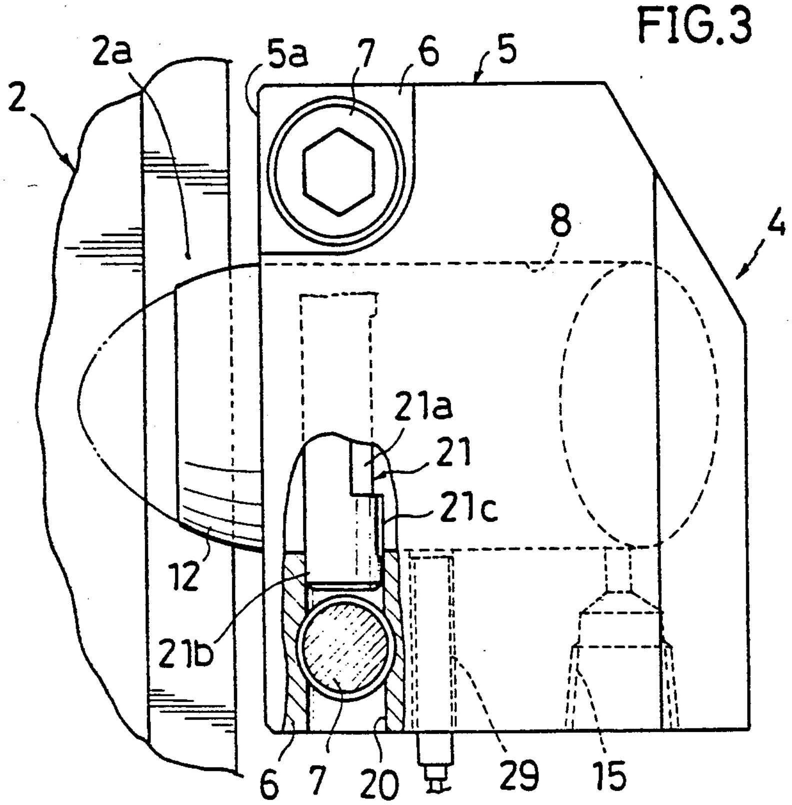
FIG. 3 is a plan view of FIG. 1.
Figure 2:
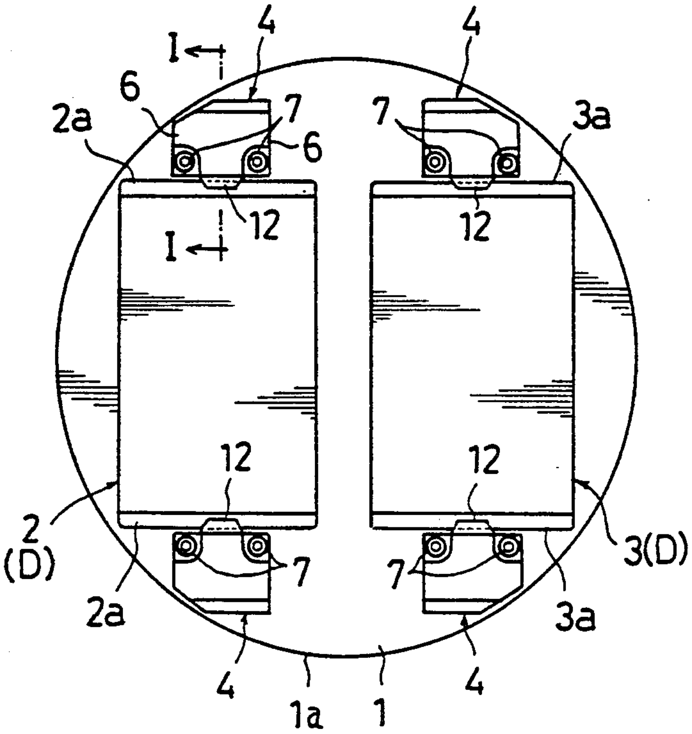
FIG. 2 is an elevational view showing a clamped metal mold on a turn table type injection molding machine using a hydraulic clamp constructed in accordance with this invention.

As shown generally in FIG. 2 and in plan view in FIG. 3, a first metal mold 2 and a second metal mold 3 generally referred to as clamped members D are clamped onto a circular turn table frame 1 constituting a fixed table of an injection molding machine by means of hydraulic clamps 4,4, respectively. Each hydraulic clamp 4 is fixedly secured to the turn table frame 1 by means of bolts 7,7 extending through both sidewalls 6,6 of clamp housing 5. Each clamp member 12 advanced from the housing 5 is adapted to clamp a vertically and horizontally extending clamping or clamped area, 2*a*, 3*a* of each metal mold, 2, 3.

For enabling the clamp 4 to be installed inside of an external peripheral surface 1A of the turn table 1, the clamp is so constructed as to extend and retract the clamping member 12 in a forwardly and downwardly inclined direction relative to the clamped member D. That is, as shown in a vertical section view according to FIG. 1 and in plan view according to FIG. 3, a cylinder bore 8 is formed in the housing 5 of the hydraulic clamp 4 so as to extend in a forwardly declining direction. An inclination angle $\phi$ of the cylinder bore 8 is preferably 25° to 45° where the hydraulic clamp 4 is of a spring return type, as shown in the present embodiment. It is most preferable that the angle be approximately 35° for making the housing 5 compact. A piston 9 is inserted in fluid tight relationship into the cylinder bore 8 through a packing 10 so as to be movable in forward and backward directions. A clamping actuation hydraulic chamber 14 is formed within the cylinder bore 8 so as to face the rear side of piston 9. An oil supply and discharge port 15 communicates with the clamping actuation hydraulic chamber 14. At least an upper portion 8*a* of the surrounding surface of the cylinder port 8 extends straight to the front portion of housing 5 and opens at a front surface 58 of the housing 5. The clamping member 12 is formed by a direct protruding (i.e., integral part of) the upper portion of piston 9 extending from its front end and guided by the upper portion 8*a* of the surrounding surface of the cylinder bore 8.

A spring accommodation recess 17 is formed in the piston 9 in such a manner as to extend backwards from the front end of piston 9. A longitudinal axis B of the spring accommodation recess 17 is arranged to lie below its longitudinal axis A of the bore 8 and piston 9. An unclamping spring 18 composed of a compression coil spring is accommodated within the spring accommodation recess 17.

Figure 1:
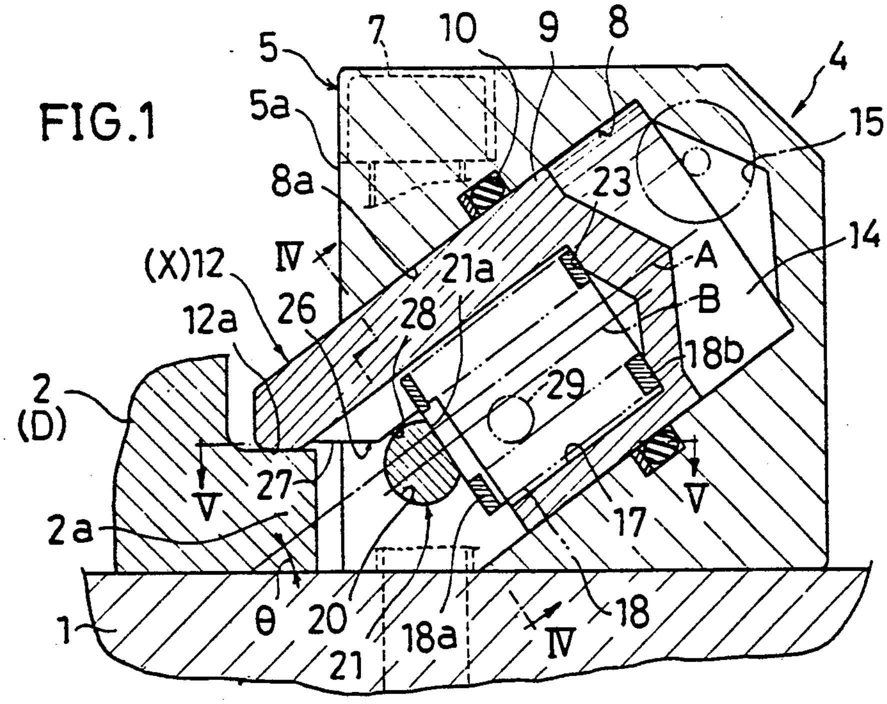
FIG. 1 shows a first embodiment of the invention and is a sectional view taken along line 1—1 in FIG. 2.
Figure 4:
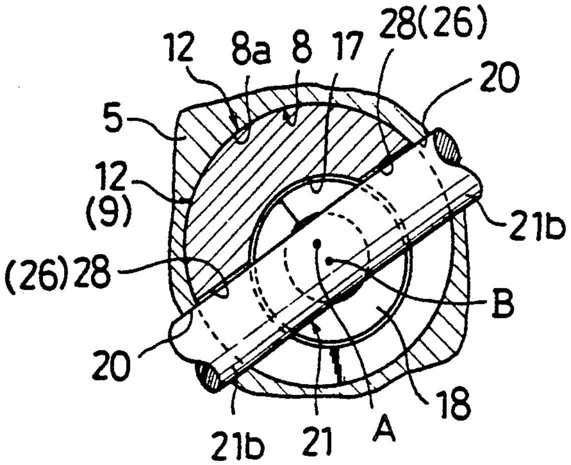
FIG. 4 is a sectional view taken along section line IV—IV in FIG. 1.
Figure 5:
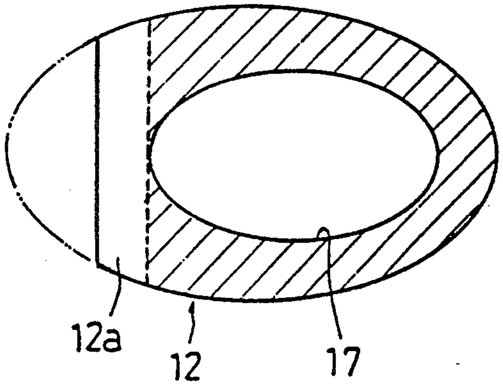
FIG. 5 is a sectional view taken along section line V—V in FIG. 1.

As shown in FIGS. 1,3 and 4, pin insertion holes 20,20 are transversely formed in the front lower portions of both sidewalls 6,6 of the housing 5. A spring retainer 21 in the form of a pin is so disposed as to, transversely cross over both the clamping member 12 and the spring accommodation recess 17, and its opposite end portions 21*b*,21*b* are supported by both the pin insertion holes 20,20. The spring retainer 21 is anchored by means of bolts 7,7. A spring front end portion 18*a* of the unclamping spring 18 is received by a central portion 21*a* of the spring retainer 21 and the spring back end portion 18*b* is received by a spring retaining seat 23 formed at the rearward most position of the spring accommodation recess 17. The clamping member 12 is provided at its lateral side portions with the left and right paired admittance grooves 26,26 so formed as to be open at its front end for preventing interference with the spring retainer 21. Each admittance groove 26 comprises a slot groove 27 formed above the downwardly facing clamping surface 12*a* of the clamping member 12 (see FIGS. 5 and 1) and a guide groove 28 formed along the longitudinal axis A of piston 9, the axis and guide grooves being interconnected to each other in the forward and backward direction relative to the cylinder bore.

The aforementioned hydraulic clamp 4 operates as follows.

Figure 6:
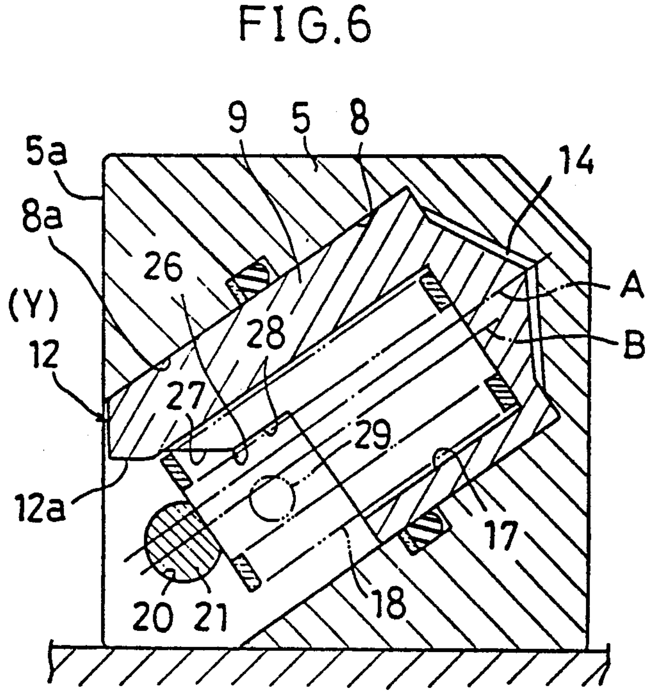
FIG. 6 is a view showing the hydraulic clamp of FIG. 1 in unclamped condition.

When in the unclamped condition as shown in FIG. 6, pressurized oil is discharged from the clamping actuation hydraulic chamber 14, and the piston 9 is retracted by means of a resilient force of the unclamping spring 18. Under this condition, the clamping member 12 is retracted to the unclamping position Y (rearward and up) and the clamping surface 12*a* there of is retracted into the inside of the front surface 5*a* of the housing 5. Each guide groove 28 of the admittance groove 26 is spaced apart from the external surrounding surface of the spring retainer 21 towards the rear side of the axis A of the piston 9.

When changing over from the unclamped condition as shown in FIG. 6 to the clamped condition as shown in FIG. 1, the pressurized oil is supplied to the clamping actuation hydraulic chamber 14. Thereupon, the piston 9 is actuated to extend forwardly by means of the pressurized oil, so that the clamping member 12 is advanced to the clamping position X (forward and down) outside the front surface 5*a* of the housing 5. Thus, the clamping area 2*a* of the metal mold 2 is fixedly clamped onto the turn table frame 1 from above through the clamping surface 12 of the clamping member 12. At the extreme or end stage of the forward movement of piston 9 when the clamping member 12 is actuated to the clamping position X as mentioned above, the clamping member 12 is guided by the respective external surrounding surfaces of the opposite end portions 21*b*, 21*b* which extend through both the guide grooves 28,28 and which prevents turning movement of the piston 9 about the axis A. The piston receiving portions 21*c* near the opposite end portions of the spring retainer 21 serve to restrain the piston 9 from being actuated forward farther than a predetermined distance.

Incidentally, in case that a height dimension of the clamped area 2*a* of the clamped member D is large, height adjusting adapter plates (not shown) are correspondingly placed between the lower surface of the housing 5 and the turn table frame 1 so as to adapt the clamp to a change in thickness of the clamped member. A limit switch 29 (FIGS. 1 and 3) is secured to one sidewall 6 of the housing 5 by means of screws so that the switch faces the cylinder bore 8. By detecting the position of the piston 9 by means of the limit switch 29, it can be determined whether the hydraulic clamp 4 is in the clamping condition or in the unclamping condition.

According to the above-mentioned construction, the following advantages can be provided.

Since the clamping member 12 protrudes directly from the front of piston 9, the clamping member can be manufactured in a large diameter substantially equal to that of the piston 9 and also will have a large cross-sectional area, so that its bending rigidity is large.

Accordingly, upward elastic deformation of the clamping member 12 will be small even in the case where pulling up impact force such as a metal mold removing force, a work processing reaction force and the like is imposed on the clamped member D when the member D is fixedly clamped onto the fixed annular table 1 of the process machine.

As a result, the member D will be prevented from being lifted upon from the fixed angular table 1 and the processing accuracy will be enhanced.

In addition, since the clamping member 12 with its large diameter and its large cross-sectional area is large, bending stress on the clamping member imposed at the time of clamping will be small, so that its fatigue life is large and it is hardly fatigued even though the number of clamping operations is high. Accordingly, service life of the hydraulic clamp is extended.

Moreover, since the clamping member 12 has a large cross-sectional area and the clamping surface 12*a* formed with a large clamping area, surface pressure exerted on the clamped portion 2*a* of the fixed member D at the time of clamping will be small, thereby preventing damage of the clamped area 2*a* of the clamped member.

By displacing the axis B of the spring accommodation recess below the bore or piston longitudinal axis, the following advantages will be provided.

Since the cross-sectional area of the clamping member 12 has become large, the aforementioned respective advantages can be further enhanced. Since the spring retainer 21 can be located on the back and lower side of the piston while the guide length for the piston 9 is kept within a certain dimension, the length of the housing 5 in the forward and backward directions becomes correspondingly shorter by that portion and the overall length of the hydraulic clamp can be shortened. Further, due to the eccentricity between the piston A and the recess axis B, abutting friction force of the unclamped spring 18 prevents the piston 9 from being turned with respect to the spring accommodation recess 17. Therefore, the clamping member 12 can be prevented from being turned at the time of clamping actuation, and an uneven contact with the clamped member D is avoided. As a result, an occasional movement and a damage of the clamped member D caused by such uneven contact will be prevented.

Further, since the spring retainer 21 serves to stop turning of the aforementioned clamping member 12 at the time of clamping actuation, an uneven contact between the clamping member 12 and the clamped member D can be prevented. As the result, an occasional movement and damage of the clamped member D caused by such uneven contact can be further prevented.

Figure 7:
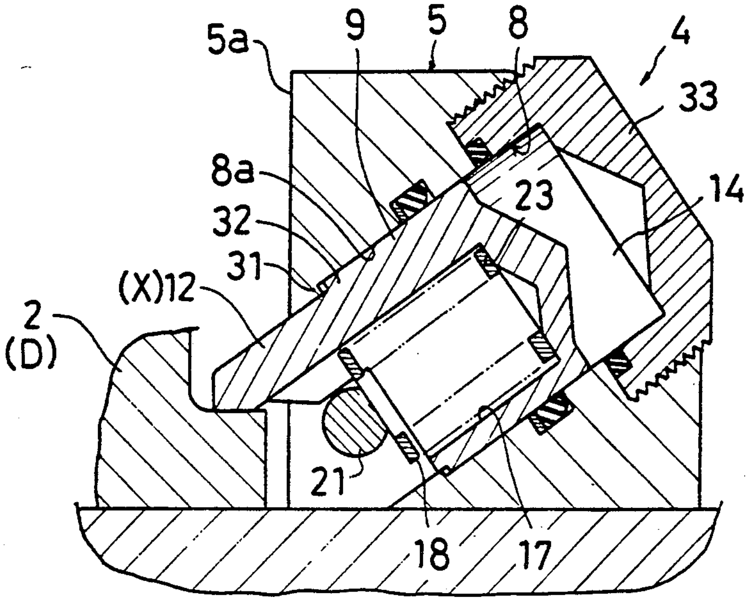
FIG. 7 shows a second embodiment of the invention and otherwise corresponds to FIG. 1.
Figure 8:
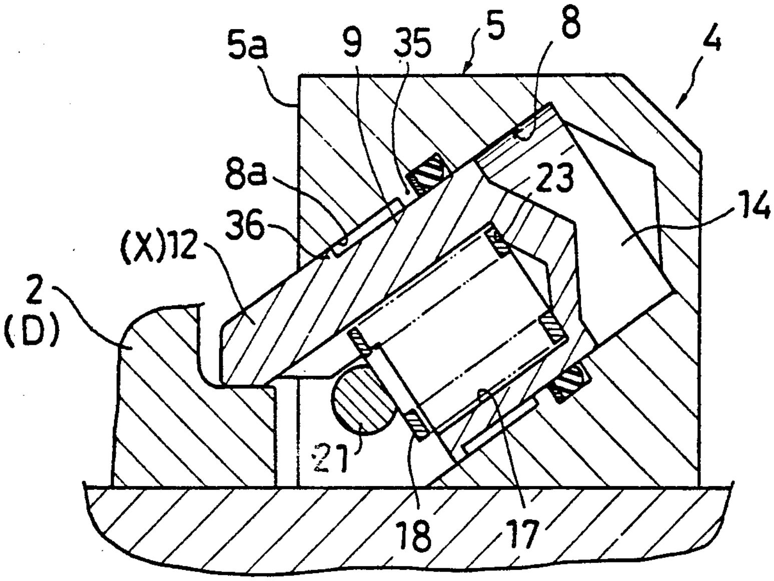
FIG. 8 shows a third embodiment of the invention but otherwise corresponding to the view of FIG. 1.
Figure 10:
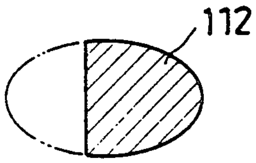
PRIOR ART FIG.10
FIGS. 9 and 10 show a conventional known embodiment of hydraulic clamp, with FIG. 9 corresponding to the view of FIG. 1 and FIG. 10 being a sectional view taken along section line X—X of FIG. 9.
Figure 9:
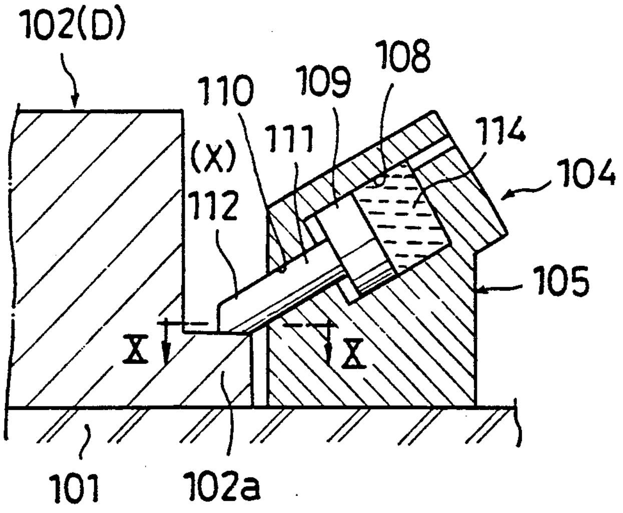
PRIOR ART FIG.9

FIGS. 7 and 8 are views corresponding to FIG. 1 and show other embodiments of the invention, respectively. Constructions different from the aforementioned first embodiment will now be explained. Component members having the same construction as those in the first embodiment are designated by the same reference numerals in all embodiments.

With reference to FIG. 7, the front portion of the cylinder bore 8 is a little reduced in diameter, and the outer diameter of the clamping member 12 is made smaller than that of the piston 9. At the time of the clamping operation, a shoulder portion 32 of the piston 9 is received in a stepped-down portion 31 of the cylinder bore 8. A back end wall of the clamping actuation hydraulic chamber 14 is provided with a hydraulic chamber 33 fixedly secured to the housing 5 by means of screwthreads.

According to the abovementioned construction, when the hydraulic clamp 4 is assembled, the assembly work becomes easy because the hydraulic chamber cover 33 is merely threadedly engaged with the housing 5 after the unclamping spring 18 and the piston 9 have been installed within the housing 5.

FIG. 8 shows a third embodiment wherein the front portion of the cylinder bore 8 is a little expanded in diameter and the outer diameter of the clamping member 12 is made larger than that of the piston 9. At the time of unclamping operation, a shoulder portion 36 of the piston 9 is received by a stepped up portion 35 of the cylinder bore 8. According to this construction, since the modular section of the clamping member 12 becomes larger, the metal mold and the clamp member 12 are more strongly secured onto the table.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that changes or modifications may be made without departing from the spirit and scope of the invention as set forth in the claims appended hereto.

I claim:

1. A hydraulic clamp with an inclined direct operated clamping-member comprising:

a housing having a front surface and at least a pair of sidewalls;

a cylinder bore formed in said housing so as to slope downwardly in a forward direction with at least an upper portion of the surrounding surface of said cylinder bore being open at the front surface of said housing;

a piston having a front end, a back surface and an upper portion, said piston inserted in said cylinder bore;

a clamping actuation hydraulic chamber formed between the back surface of said piston and said cylinder bore;

a clamping member protruding in a forward direction from the upper portion of the front end of said piston;

a spring accommodation recess in the piston formed so as to extend rearwardly from the front end of said piston, and a spring retaining seat formed in the rearward most portion of said spring accommodation recess;

a spring retainer supported by said housing in front of said piston; and an unclamping spring for biasing said piston rearwardly installed between said spring retainer and said spring retaining seat of said spring accommodation recess.

2. A hydraulic clamp as claimed in claim 1, wherein said piston and spring have longitudinal axes, and the longitudinal axis of said spring accommodation recess is disposed below the longitudinal axis of said piston.

3. A hydraulic clamp as claimed in claim 2 wherein said spring retainer is supported by both sidewalls of said housing in such a manner as to transversely cross said clamping member and said spring accommodation recess;

said clamping member being provided at its lateral side portions with left and right paired admittance grooves formed so as to open at the forward end of the clamping member for preventing interference with said spring retainer;

each admittance groove comprising a notch groove formed rearwardly of the clamping surface of the clamping member facing downward and guide grooves formed parallel to the axis of the piston, said notch and guide grooves being interconnected with each other and extending in a forward and backward direction;

whereby when the clamping member is in the retracted unclamped condition, both of the guide grooves are spaced apart from the external surrounding surface of the spring retainer, and when the clamping member is moved towards its extreme clamped position, the clamping member is guided by the respective external surrounding surfaces of both side portions of said spring retainer through both the guide grooves.

4. A hydraulic clamp as claimed in claim 3, wherein the inclination angle of said cylinder bore is 25°–45°.

5. A hydraulic clamp as claimed in claim 4, including insertion holes for said spring retainer 21 transversely formed in the four lower portions of both sidewalls of said housing; and a pair bolts for securing said housing extending vertically through said both sidewalls and intersecting said insertion holes at positions located beyond the opposite ends of said spring retainer.

6. A hydraulic clamp as claimed in claim 1, wherein said clamping member is an integral extension of the front end of said piston.

* * * * *